O. CROSBY.
ROPE CLAMP.
APPLICATION FILED MAY 25, 1908. RENEWED OCT. 22, 1909.
944,718.
Patented Dec. 28, 1909.
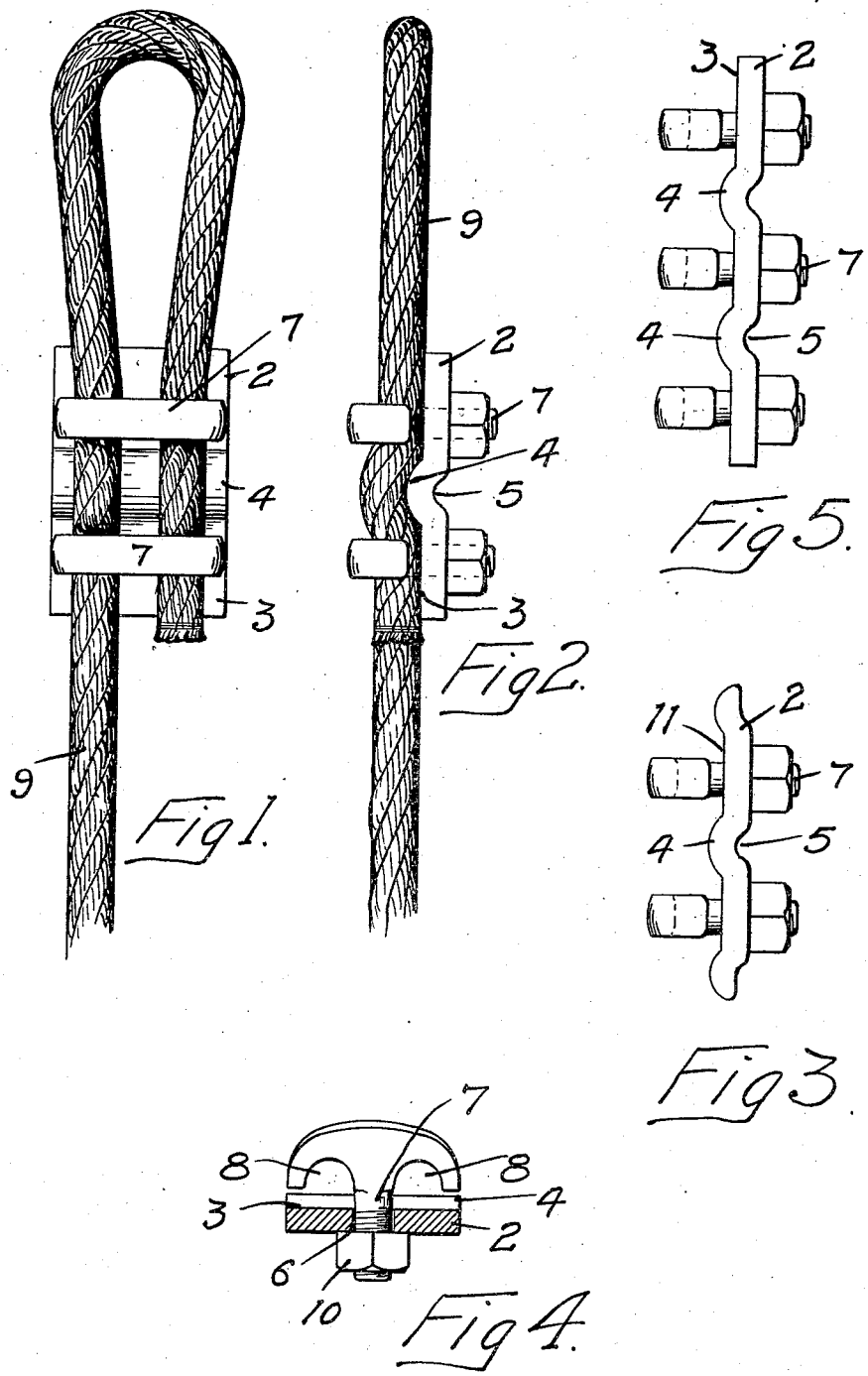

UNITED STATES PATENT OFFICE.

OLIVER CROSBY, OF ST. PAUL, MINNESOTA.

ROPE-CLAMP.

944,718. Specification of Letters Patent. Patented Dec. 28, 1909.

Application filed May 25, 1908, Serial No. 434,742. Renewed October 22, 1909. Serial No. 524,067.

*To all whom it may concern:*

Be it known that I, OLIVER CROSBY, of St. Paul, Ramsey county, Minnesota, have invented certain new and useful Improvements in Rope-Clamps, of which the following is a specification.

The object of my invention is to provide a rope clamp of simple economical construction, and one which will be very effective for the purpose designed.

A further object is to reduce the number of parts of the clamp to a minimum and thereby effect a considerable saving in the cost of manufacture.

The invention consists generally in a rope clamp substantially as shown and pointed out in the claims.

In the accompanying drawings, forming part of this specification, Figure 1 is a top view of a clamp embodying my invention. Fig. 2 is a side view of the same. Fig. 3 is a similar view showing a slightly modified construction with the clamp separated from the rope or cable. Fig. 4 is a sectional view illustrating the form of clamping bolt employed. Fig. 5 is a side view showing another modified construction.

In the drawing, 2 represents a plate formed in any suitable way, as by drop-forging, having flat end surfaces 3 and a transverse centrally arranged rib 4 formed thereon. Holes 6 are provided on each side of the rib 4 to receive T-bolts 7 having recesses 8 in their heads on each side of the shank to receive the rope or cable 9. The threaded ends of the bolt shanks have nuts 10 on the under side of the plate, which when turned up, draw the bolt heads down upon the rope and clamp it securely against the plate. The rib 4 causes a bend to be formed in the rope and increases the frictional contact of the plate therewith, thereby reducing to a considerable degree the danger of slippage.

In Fig. 3, the ends of the plate are raised above the surfaces 11. This has the effect of causing bends to be formed in the rope and increases the frictional engagement thereof with the plate.

In Fig. 5 a modification is shown in the construction of the plate which consists in providing two transverse ribs thereon with a third clamping bolt between them. In other respects the plate is substantially the same as the one shown in Fig. 1.

I claim as my invention:

1. A rope clamp comprising a plate having a transverse rib formed thereon and provided with holes on each side of said rib, T-shaped bolts having threaded shanks fitting with said holes and provided with nuts, and the heads of said bolts having recesses on each side of said shanks to receive the rope, and the rib formed on said plate causing a bend or turn in the rope between said bolts and increasing the frictional contact between said plate and rope, substantially as described.

2. A rope clamp comprising a plate having a transverse rib formed thereon, and holes on each side of said rib and depressions formed in the ends of said plate around said holes, T-shaped bolts having threaded shanks fitting within the holes in said plate and having nuts and recesses provided in said head on each side of said shanks and adapted to receive the rope, and said bolts when tightened forcing the rope against said rib and into said recesses and causing the bends or offsets to be formed in the rope and increasing the frictional engagement thereof with said plate.

3. A rope clamp comprising a plate having flat surfaces and an intermediate transverse rib formed thereon, and said plate having holes in said flat surfaces on each side of said rib, and bolts having threaded shanks fitting within said holes and provided with nuts and heads adapted to engage the rope and clamp the same against said plate on each side of said rib, the pressure of the rib on the rope forming bends or offsets therein, for the purpose specified.

4. A rope clamp, comprising a plate, having holes therein and a transverse rib intermediate to said holes, bolts having threaded shanks fitting within said holes, the heads of said bolts having recesses to receive the rope to be clamped, and said rib causing a bend or turn to be formed in the rope, thereby increasing the frictional contact between said plate and rope, substantially as described.

5. A rope clamp, comprising a plate having holes therein and a transverse rib intermediate to said holes, means having threaded shanks fitting within said holes and adapted to engage the rope or cable to be clamped, said rib causing a bend or turn to be formed in the rope or cable, thereby increasing the frictional contact between it and said plate.

In witness whereof, I have hereunto set my hand this 20th day of May 1908.

OLIVER CROSBY.

Witnesses:
ELIJAH BAKER,
C. F. KLEIN.